United States Patent

Langer

[15] 3,667,279
[45] June 6, 1972

[54] DIFFERENTIAL THERMAL ANALYSIS CELL ASSEMBLY

[72] Inventor: Horst G. Langer, Wayland, Mass.

[73] Assignee: The Dow Chemical Company, Midland, Mich.

[22] Filed: Oct. 8, 1969

[21] Appl. No.: 870,000

Related U.S. Application Data

[63] Continuation-in-part of Ser. No. 848,231, Aug. 7, 1969, abandoned.

[52] U.S. Cl. .................................73/15 B, 250/41.9 SE
[51] Int. Cl. ..............................................G01n 25/00
[58] Field of Search.................................73/15; 250/41.9

[56] References Cited

UNITED STATES PATENTS

| | | | |
|---|---|---|---|
| 2,797,575 | 7/1957 | Sand | 73/15 |
| 3,283,560 | 11/1966 | Harden et al. | 73/15 |
| 3,285,053 | 11/1966 | Mazieres | 73/15 |
| 3,303,689 | 2/1967 | Paulik et al. | 73/15 |
| 3,319,456 | 5/1967 | Speros et al. | 73/15 |
| 3,491,581 | 1/1970 | Roberts et al. | 73/15 |

OTHER PUBLICATIONS

Barrall et al. " Differential Thermal Analysis Apparatus" in Analytical Chemistry Vol. 35 No. 12 Nov., 1963 p. 1837–1840

*Primary Examiner*—Richard C. Queisser
*Assistant Examiner*—Herbert Goldstein
*Attorney*—Griswold & Burdick and Earl D. Ayers

[57] ABSTRACT

This invention relates to a thermal analysis cell which is capable of supplying meaningful data in a high vacuum and which is particularly useful for operations within a mass spectrometer or similar instrument which allows the heating of samples within the confinement of the mass spectrometer vacuum or adjacent to the ion source. The cell comprises a silver block to guarantee uniform heat throughout the cell. It is insulated against the push-through shaft by a section of boron nitride, which is an excellent thermal insulator, and by sapphire or alumina, for example. The silver cell is equipped with two equal temperature sensing wells containing sample and reference temperature sensing means. A third and usually smaller well, designed to contain the block temperature sensing means, is usually provided. The sample itself is loaded into a metal cup which is secured to its well, and which contacts the temperature sensing means. A similar cup, usually containing non-reactive material, is inserted in the reference well and contacts its temperature sensing means, usually a thermocouple. The cell assembly has a detachable temperature sensing head part.

11 Claims, 3 Drawing Figures

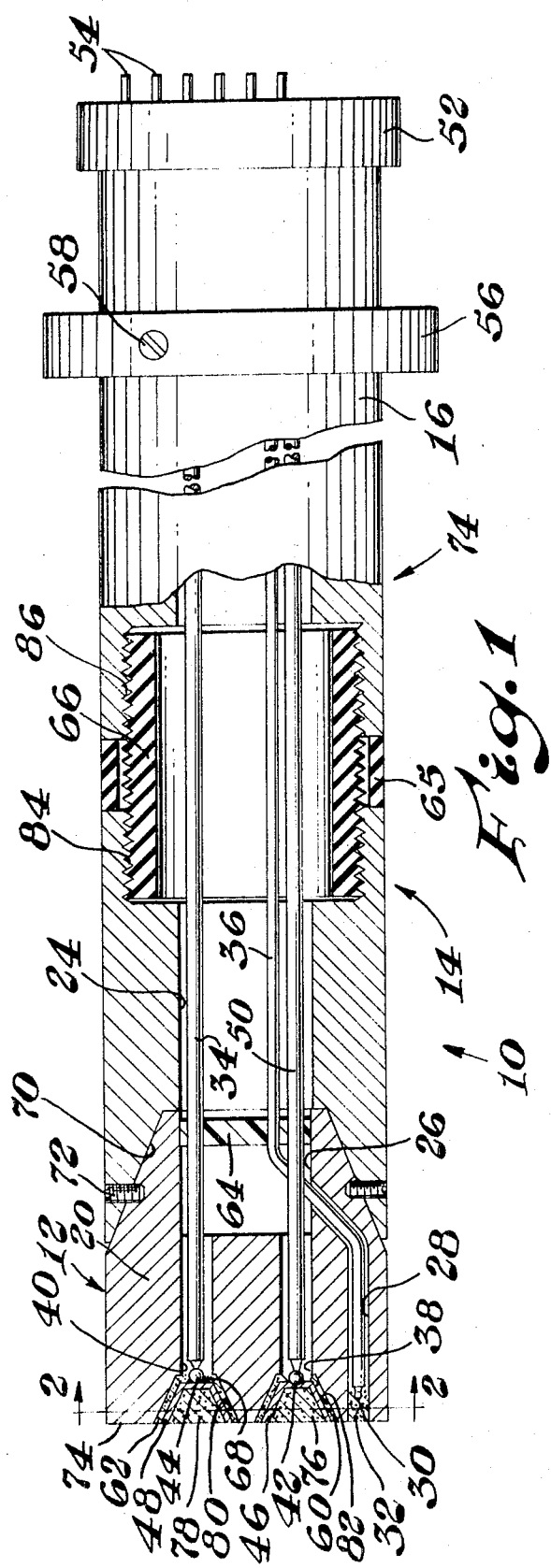

DIFFERENTIAL THERMAL ANALYSIS CELL ASSEMBLY

This application is a continuation-in-part of Horst G. Langer's copending U.S. Pat. application Ser. No. 848,231, filed Aug. 7, 1969, for "Differential Thermal Analysis Cell Assembly," now abandoned.

BACKGROUND OF THE INVENTION

This invention relates to differential thermal analysis cells and particularly to differential thermal analysis cells for use in a high vacuum such as exists inside a mass spectrometer, for example.

A thermal analysis cell which is capable of supplying meaningful data in a high vacuum is particularly useful for operations within a mass spectrometer or similar instrument.

However, even though mass spectrometers are sometimes equipped with devices which allow the heating of samples within the confinement of the mass spectrometer vacuum or within the ion source, and such devices sometimes also allow the measurement of sample temperatures during the heating process, these devices do not allow the operation known as differential thermal analysis.

In differential thermal analysis, it is essential that the sample be heated at a predetermined rate of heating, usually a linear rate, that the sample temperature be known and indicated at all times, and for differential thermal analysis operations the sample temperature be continuously compared with that of an inert material in the same cell.

In general, this requires that the thermocouples located in the thermal analysis cell should be precisely at the same temperature at all times unless a chemical reaction occurs in the sample. Thus, it is also of extreme importance that equal heat transfer is guaranteed from the heat source to the thermal analysis cell, that no temperature gradient exists in the cell itself, that fast heat transfer is provided from the cell to the sample and that each thermocouple remains electrically insulated.

In addition, to make a cell useful it must be possible to load a sample into the cell and introduce the cell with the sample into a mass spectrometer without shutting down the operation of a mass spectrometer or other evacuated systems.

Further, it is desirable to be able to quickly change sample cells and/or the sample cell head area.

A principal object of this invention is to provide an improved differential thermal analysis cell assembly.

Another object of this invention is to provide an improved differential thermal analysis cell assembly which is adapted to be used in a high vacuum.

In accordance with this invention, there is provided a cell assembly for insertion in a high vacuum device. The cell assembly comprises closely but detachably coupled blocks of good thermally conductive metal, such as silver, for example, to guarantee uniform heat throughout the cell, and a push through shaft part. It is insulated against the push-through shaft by which it is inserted in the mass spectrometer or other high vacuum device by a section of boron nitride or other suitable material which is an excellent thermal insulator. The silver cell assembly is equipped with two equal temperature sensing wells containing the sample thermocouple and the reference thermocouple. A third well, designed to contain the control temperature sensing means, is usually provided. In any event, means are provided whereby a furnace temperature control signal may be derived. The sample itself is loaded into a metal cup, pushed into the sample well and secured thereto in contact with its temperature sensing means. This temperature sensing means usually consists of a chromel-alumel or other thermocouple which contacts the sample cup. The thermocouple and sample cup are usually cemented in place in the silver block. Small sample sizes assure fast and uniform heating of the sample while the temperature sensor contacting the sample cup guarantees fast response to thermal effects in the sample itself.

The cell head and the rest of the cell body fit closely together, but may be detached, permitting new heads to be interchanged with the remainder of the cell assembly.

The only efficient way of heat transfer in a vacuum is by radiation, thus the DTA cell itself is surrounded during operation by a radiative furnace.

The invention, as well as additional objects and advantages thereof, will best be understood when the following detailed description is read in connection with the accompanying drawing, in which:

FIG. 1 is a side elevational view, partly broken away and in section, of a differential thermal analysis cell assembly in accordance with this invention;

FIG. 2 is a sectional view taken along the line 2—2 of FIG. 1; and

Figure 3:
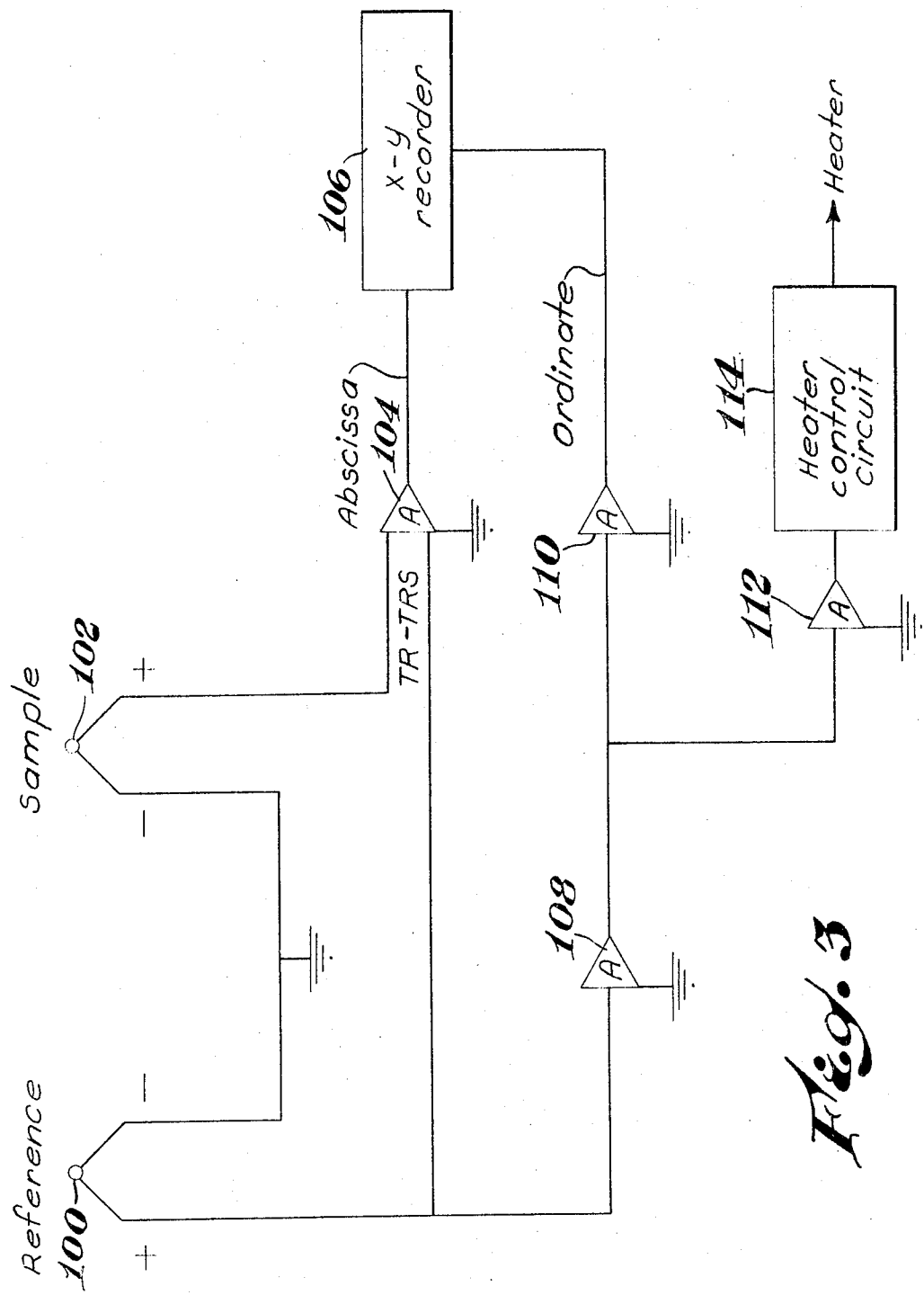
FIG. 3 is a simplified block diagrammatical view showing means for deriving a reference signal and a heating furnace control signal from a single temperature sensor.

Referring to the drawing, there is shown a differential thermal analysis cell assembly, indicated generally by the numeral 10.

The assembly 10 comprises a cell head, indicated generally by the numeral 12, a cell body part, indicated generally by the numeral 14, a thermally insulating coupler 66 and a probe rod part 16.

The cell 12 comprises an elongated cylindrical silver block 20 having a flat end 74 and sloping rear end part 70 which contains axial off-center bores 38, 40 which extends inwardly from the end 74 of the silver block 20. A large diameter bore 24, axially aligned between the bores 38, 40 extends towards and communicates with the bores 38, 40 are counterbored so that their ends facing the end 74 of cell head 20 have sloping walls 82, 80, respectively, the wider diameter of the counterbored part being at the end 74 of the cell head.

A bore 28 extends inwardly from the end 74 of the cell head and communicates with the large diameter bore 26. A temperature sensor, such as a thermocouple 30, is disposed in the bore 28 near the end 74, the open end of the bore 28 being closed with a suitable ceramic cement 32. The cable 36 containing the electrical leads from the thermocouple passes through the bores 28, 26, 24, for example and terminate at the pins 54 of connector 52.

Thermocouples 42, 44, in bores 38, 40, respectively similarly have their cable leads 34, 50 extend to the connector 52 and suitable terminal pins 54. A suitable gas tight seal, usually made of wax, such as Apiezon wax, or a cement such as DeKhotinski cement, provides a closure between the cables 34, 36, 50 and the wall of the bore 26.

Metal cups, shaped to conform with the sloping counterbored parts 82, 80 of bores 38, 40 respectively are fitted into the counterbored parts 82, 80 respectively and secured in place by suitable cement 60, 62.

The thermocouple 44 is illustrated as having a fusion contact with the cup 48 while a surface contact only is provided between the cup 46 and thermocouple 42.

Because the cups are identical, either cup may be used as the sample containing cup. The cup used as the reference cup usually is filled with chemically nonreactive material such as particulated alumina, for example, suitably cemented in place, for example.

The cell body section 14 is made of a material similar to the cell head, such as silver, for example, and is of generally cylindrical outer configuration.

The body section 14 has a large diameter axial bore 24 extending therethrough from end to end.

One end of the bore 24 is counterbored and has sloping walls 70 which are shaped to mate closely with the sloping walled end of the cell head 20. The cell head 20 is held in mating relationship with the body part 14 by means of set screws 72, for example.

The other end of the body part 14 is counterbored to provide an internally threaded coupling part 84.

An electrical and thermally insulating coupling element 66 is conveniently made of boron nitride and is a tubular element having a smooth inner wall and threaded outer wall surface which engages the threaded part 84 of cell body section 14 and the threaded counterbored part 86 of the probe tube 16.

The probe tube 16 is of hollow cylindrical configuration and has the cables 34, 36, and 50 extend therethrough as previously mentioned to terminate at one end to the connector 52 which is coupled to the end of the probe tube 16 which is most remote from the silver block 20.

An annular shaped handle and stop member 56 fits over the probe tube 16 and is held in pre-determined position by the set screw 58.

An annular sealing element 65 adapted to fit over the thermal and electrically insulating coupler element 66 provides a gas tight thermally and electrically insulating outer seal between the probe tube 16 and the cell body section 14 as the parts 16 and 14 are tightened on the coupler 66. The outer diameter of the sealing element 65, made of sapphire or other suitable material, for example, is usually the same as the common outer diameter of the tube 16 and body section 14.

The entire assembly 10 is adapted to be inserted into a high vacuum device such as a mass spectrometer, for example through suitable sealable entry means (not shown). The sample and reference cups may be made of silver or other non-reactive metal which is an excellent thermal conductor. A cell probe entry and cell heating means which is especially useful in connection with this and other cell assemblies is disclosed and claimed in F. J. Karle's copending Pat. application Ser. No. 742,868, entitled "Furnace Assembly for Thermal Analysis Use," filed July 5, 1968.

It has been found that the device satisfies the desired conditions that the thermocouples located in the thermal analysis cell should be precisely at the same temperature at all times unless a chemical reaction occurs in the sample; that no temperature gradient exists in the cell itself, and that fast heat transfer is provided from the cell to the sample and that each thermocouple remains electrically insulated.

The identical sample and reference cell cup assemblies help assure that the only difference in the temperature observed by their respective temperature sensors is due to characteristics of the sample material.

The use of a separate cell head and cell body section permits the quick changing of cell heads for use with the rest of the assembly. Although not shown here, quick coupling means to connect and disconnect the cables 34, 36, 50 are often used.

While the invention has been described as having three separate temperature sensors (usually thermocouples) for developing signals representing sample and reference temperatures and a furnace control signal, these signals may be derived from two temperature sensors.

Referring to FIG. 3, it may be seen that the outputs of the reference temperature sensor 100 and sample temperature sensor 102 are coupled to the input of a very high input impedance operational amplifier 104 in a subtractive relationship. The output of the amplifier 104 drives the abscissa of an X-Y-type recorder 106.

The reference signal is also coupled to a very high input impedance operational amplifier 108 whose output is coupled to the input of very high input impedance amplifiers 110, 112 respectively.

The output of the amplifier 112 is coupled to a heater control circuit which is in turn coupled to the furnace (not shown) used to heat the cell assembly.

The output of amplifier 110 is coupled to the ordinate drive of the X-Y recorder 106.

The very high input impedance of 104, 108, prevents signal interaction which would hinder the use of the reference sensor signal also being used as the furnace control signal (or vice versa). It is assumed that the placement of the second (usually the reference) temperature sensor in the assembly is such that the output signal is suitable as the furnace control signal.

Thus, while it may be convenient to use three temperature sensors in many applications, the alternative shown in simplified form in FIG. 3 may be used.

The close mating fit between the cell head and cell body section prevents passage of contaminating materials or gases into the interior of the cell assembly. Similarly, the temporary seal 64 serves to prevent the passage of materials to the bore 24 from the cell head.

The press-fitting of the sample or reference cup against the temperature sensing thermocouple provides good temperature transferring contact plus makes possible the easy changing of cups without disturbing the rest of the cell assembly.

In addition, to make a cell useful it must be possible to load a sample into the cell and introduce the cell with the sample into a mass spectrometer without shutting down the operation of a mass spectrometer or other evacuated systems. This is easily accomplished with cell assemblies in accordance with this invention.

What is claimed is:

1. A differential thermal analysis cell assembly for use under high vacuum conditions, comprising a cell section, a thermal isolation section and a hollow probe section, said sections being joined together in the order listed in end-to-end relationship to form a unitary structure and having, when so joined, a generally cylindrical configuration with a smooth substantially constant diameter outer surface, said cell section being generally cylindrically shaped and having a removable cell head part and a cell body part of highly thermally conductive metal, said cell section having a sample cell receiving bore and a reference cell receiving bore extending axially into said cell section from one end, and communicating with a larger diameter bore which extends to the other end of said cell section, each of said cell receiving bores having sloping walled counterbored parts at their outer ends in said cell head, each of said sloping walled counterbored parts having disposed therein a metal cup whose walls mate with said sloping walled parts, said cups each being thermally coupled to said cell head part, a pair of temperature sensing elements, one of said temperature sensing elements being disposed in each of said cell receiving bores and each thermally contacting one of said cups, means for developing a temperature control signal whose value is a function of the temperature of said cylindrically shaped part of highly conductive metal, each of said temperature sensing elements having electrical leads which extend through said cell section, thermal isolation section and probe section, said cell section having coupling means adapted to receive a part of said thermal isolation section, said thermal isolation section comprising an element made of thermal and electrical insulating material be coupled at its ends to said cell section and to said probe section.

2. A cell assembly in accordance with claim 1, wherein said metal cups are substantially identical.

3. A cell assembly in accordance with claim 1, wherein said means for developing a temperature control signal comprises a separate bore adjacent to but spaced from said reference cell.

4. A cell assembly in accordance with claim 1, wherein each of said temperature sensing elements is electrically insulated from the other.

5. A cell assembly in accordance with claim 1, wherein said part made of highly thermally conductive metal is made of silver.

6. A cell assembly in accordance with claim 1, wherein said thermal isolation section includes an annular thermal and electrically insulating element sealed between said cell section and said probe section, said annular element having an outer diameter at least approximately the same as the outer diameters of the cell section and probe section.

7. A cell assembly in accordance with claim 1, wherein the rear end of said head part mates with the forward part of said body part.

8. A cell assembly in accordance with claim 7, wherein means are provided for holding said head part and body part in operative positional relationship.

9. A cell assembly in accordance with claim 1, wherein a gas tight seal is provided between said leads and the adjacent surfaces of said cell head part.

10. A cell assembly in accordance with claim 1, wherein said cups are fusion sealed to said temperature sensing elements.

11. A cell assembly in accordance with claim 1, wherein said cups mechanically contact said temperature sensing elements.

* * * * *